United States Patent
Fan

(10) Patent No.: US 12,478,818 B2
(45) Date of Patent: Nov. 25, 2025

(54) FOAMABLE COMPOSITION

(71) Applicant: FLAME SECURITY INTERNATIONAL PTY LTD, Kensington (AU)

(72) Inventor: Ka Wai Fan, Kensington (AU)

(73) Assignee: Flame Security International Pty Ltd., Kensington (AU)

( * ) Notice: Subject to any disclaimer, the term of this patent is extended or adjusted under 35 U.S.C. 154(b) by 0 days.

(21) Appl. No.: 19/052,695

(22) Filed: Feb. 13, 2025

(65) Prior Publication Data

US 2025/0186823 A1 Jun. 12, 2025

Related U.S. Application Data

(63) Continuation of application No. PCT/AU2023/050779, filed on Aug. 17, 2023.

(51) Int. Cl.
*A62D 1/02* (2006.01)
*A62D 1/00* (2006.01)

(52) U.S. Cl.
CPC ......... *A62D 1/0071* (2013.01); *A62D 1/0014* (2013.01); *A62D 1/005* (2013.01); *A62D 1/0064* (2013.01)

(58) Field of Classification Search
None
See application file for complete search history.

(56) References Cited

U.S. PATENT DOCUMENTS 9,963,627 B2 * 5/2018 Rajagopalan ....... F28D 20/0056
10,100,175 B2   10/2018 Gawad et al.
10,202,517 B2 *  2/2019 Catchmark ............ D21H 17/22
11,208,246 B2 * 12/2021 Boswell ................ C23C 16/405
2017/0314200 A1  11/2017 Johansson et al.
2019/0169421 A1 *  6/2019 Zhang ...................... C08G 8/10
2021/0362924 A1 * 11/2021 Boswell ................... C08J 7/048

OTHER PUBLICATIONS

Brinkmann et al., Correlating Cellulose Nanocrystal Particle Size and Surface Area, American Chemical Society, Langmuir, vol. 32, May 26, 2016, pp. 6105-6114.
International Application No. PCT/AU2023/050779, Written Opinion mailed on Aug. 28, 2023, 5 pages.
Trache et al., Nanocellulose: From Fundamentals to Advanced Applications, Frontiers in Chemistry, vol. 8, No. 392, May 2020, pp. 1-33.
Voisin et al., 3D Printing of Strong Lightweight Cellular Structures Using Polysaccharide-Based Composite Foams, American Chemical Society, Sustainable Chemistry & Engineering, vol. 6, Nov. 1, 2018, pp. 17160-17167.
Voisin et al., 3D Printing of Strong Lightweight Cellular Structures Using Polysaccharide-based Composite Foams, Supporting Information, American Chemical Society Sustainable Chemistry & Engineering, Nov. 1, 2018, pp. S1-S9.
Xiang et al., How Cellulose Nanofibrils Affect Bulk, Surface, and Foam Properties of Anionic Surfactant Solutions Biomacromolecules, vol. 20, Sep. 3, 2019, pp. 4361-4369.

* cited by examiner

*Primary Examiner* — Joseph D Anthony
(74) *Attorney, Agent, or Firm* — Kilpatrick Townsend & Stockton LLP

(57) ABSTRACT

Foamable liquid compositions containing aqueous dispersions of cellulose nanocrystals and/or cellulose nanofibrils, nanoclay and surfactant are provided. The foamable liquid compositions provide stable foams useful in the protection of structures against the spread of fire.

28 Claims, 4 Drawing Sheets

FOAMABLE COMPOSITION

CROSS-REFERENCE TO RELATED APPLICATIONS

The current application is a continuation of PCT/AU2023/050779 filed Aug. 17, 2023, which application claims priority to AU 2022902369, filed Aug. 19, 2022, the contents of which are both hereby incorporated by reference in their entireties for all purposes.

FIELD OF THE DISCLOSURE

The present disclosure relates to foamable liquid compositions containing aqueous dispersions of cellulose nanocrystals and/or cellulose nanofibrils, nanoclay and surfactant. The foamable liquid compositions provide stable foams useful in the protection of structures against the spread of fire.

BACKGROUND OF THE DISCLOSURE

A characteristic of wildfires or bush fires is the formation of burning embers. These burning embers may be blown by the wind and contribute to the rapid spread of fire over an area. Accordingly, structures even some distance from the fire front may be at risk if burning embers are deposited on or close to the structure.

While structures may be protected to some extent through the use of fire retardant coatings, burning embers may be caught in gaps in structures, such as in gutters and the like, allowing fire to take hold and placing the structure itself at risk.

It would be useful if such gaps in structures could be protected from burning ember ingress so that the risk of structural fire, and thus loss, is avoided or at least mitigated to some degree. The present disclosure is concerned with addressing this risk.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE DISCLOSURE

In one aspect the present disclosure provides a foamable liquid composition comprising:
  a) 0.5 wt. % to about 4 wt. % of one or both of cellulose nanocrystals and cellulose nanofibrils;
  b) about 0.1 wt. % to about 5 wt. % of one or more nanoclays;
  c) about 0.1 wt. % to about 3 wt. % of one or more surfactants; and
  d) up to about 98 wt. % water;
based on the total weight of the foamable liquid composition;
wherein the one or more surfactants comprise at least one alkylated cellulose.

In embodiments, the foamable liquid composition comprises:
  a) 0.5 wt. % to about 2 wt. % of one or both of cellulose nanocrystals and cellulose nanofibrils;
  b) about 0.1 wt. % to about 2 wt. % of one or more nanoclays;
  c) about 0.1 wt. % to about 2 wt. % of one or more surfactants; and
  d) up to about 98 wt. % water;
based on the total weight of the foamable liquid composition;
wherein the one or more surfactants comprise at least one alkylated cellulose.

In embodiments, the foamable liquid composition comprises:
  a) 0.5 wt. % to about 2 wt. % of one or both of cellulose nanocrystals and cellulose nanofibrils;
  b) about 0.1 wt. % to about 1 wt. % of one or more nanoclays;
  c) about 0.2 wt. % to about 1 wt. % of one or more surfactants; and
  d) up to about 98 wt. % water;
based on the total weight of the foamable liquid composition;
wherein the one or more surfactants comprise at least one alkylated cellulose.

In some embodiments, the cellulose nanocrystals or nanofibrils are needle shaped with a length less than about 500 nm and a diameter less than about 20 nm.

In some embodiments, the cellulose nanocrystals or nanofibrils have a surface area of greater than about 300 $m^2/g$.

In some embodiments, the nanoclay comprises one or more of montmorillonite, bentonite, kaolinite, hectorite, and halloysite.

In some embodiments, the nanoclay comprises bentonite.

In embodiments, the nanoclay has an average particle size (d50) of less than about 75 micron.

In embodiments, the one or more surfactants comprise one or more alkylated cellulose derivatives. The one or more alkylated cellulose derivatives may comprise one or more of alkyl cellulose, hydroxyalkyl alkyl cellulose, and carboxyalkyl alkyl cellulose. Suitable alkylated cellulose include, for example, methyl cellulose, ethyl cellulose, methylethyl cellulose, hydroxylpropyl methyl cellulose, hydroxyethyl methyl cellulose, and carboxymethyl methyl cellulose.

In embodiments a 2 wt. % aqueous solution of the one or more cellulose derivatives has a viscosity of about 25 to about 4000 mPa·s, measured at 20° C.

In embodiments, the foamable liquid composition has a viscosity of about 10 to about 2000 mPa·s, or from about 10 to about 1000 mPa·s, measured at 20° C.

In embodiments, the foamable liquid composition possesses thixatropic properties.

The foamable liquid composition may further comprise one or more auxiliaries.

In embodiments, the foamable composition comprises a stable dispersion of one or both cellulose nanocrystals and cellulose nanofibrils, and nanoclay.

In another aspect the present disclosure provides a method of preparing a foamable liquid composition according to any one of the herein disclosed embodiments comprising combining one or both cellulose nanocrystals and cellulose nanofibrils, one or more nanoclays, one or more surfactants, and water.

In embodiments the one or both cellulose nanocrystals and cellulose nanofibrils, and the one or more nanoclays are separately dispersed in water before combining, followed by addition of the one or more surfactants.

In another aspect, the present disclosure provides a foam comprising the foamable liquid composition according to any one of the herein disclosed embodiments and air.

In embodiments, the foam has a volume expansion ratio of greater than 2, or greater than 3, or greater than 4. That is, the volume of foamable liquid composition expands by a factor of greater than 2, or greater than 3, or greater than 4, upon foaming.

In embodiments, subsequent to foam creation, the foam loses less than 70% by weight of water content through evaporation after 48 hours of exposure to a temperature of 40° C.

In embodiments, subsequent to foam creation, the foam loses less than 50% by weight of water content through evaporation after 48 hours of exposure to a temperature of 40° C.

In embodiments, subsequent to foam creation, the foam volume decreases by less than 25%, when stored for 7 days at 20° C.

In embodiments, subsequent to foam creation, the amount of water lost from the foam through drainage is less than 25% by weight, when the foam is stored for 7 days at 20° C.

In embodiments, the foam remains substantially structurally intact when exposed to flame.

In embodiments, the foam loses less than 90% of its mass after exposure to flame.

In another aspect the present disclosure provides a method of preparing a foam from the foamable liquid composition according to any one of the herein disclosed embodiments, comprising entraining air into the foamable liquid composition.

In another aspect the present disclosure provides a method of protecting an area against the spread of fire comprising covering at least part of the area with the foam according to any one of the herein disclosed embodiments.

In embodiments, the area is a structure, for example, a structure comprising one or more of wood, metal, concrete, and brick.

In embodiments, the area is a structural gap, and the structure comprises one or more of wood, metal, concrete, and brick.

In embodiments, the foam protects the structural gap from ember ingress into the structural gap.

In another aspect the present disclosure provides the use of foam according to any one of the herein disclosed embodiments in protecting an area against the spread of fire.

Advantages of the foamable liquid compositions and foams of the present disclosure include one or more of the following:

- the foamable liquid compositions are simple to prepare and use;
- the foamable liquid compositions may be prepared from environmentally benign components;
- the foamable liquid compositions are stable dispersions;
- the foamable liquid compositions have a viscosity suitable for ease of transfer;
- the foams possess an excellent balance of long term stability, low water drainage and low evaporative loss of water;
- the foams are structurally stable even after thermal degradation;
- the foams bridge or fill gaps in structures, thus reducing the chance of burning ember ingress.

Any embodiment herein shall be taken to apply mutatis mutandis to any other embodiment unless specifically stated otherwise.

The present disclosure is not to be limited in scope by the specific embodiments described herein, which are intended for the purpose of exemplification only. Functionally-equivalent products, compositions and processes are clearly within the scope of the disclosure, as described herein.

Further aspects of the present disclosure and further embodiments of the aspects described in the preceding paragraphs will become apparent from the following description, given by way of example and with reference to the accompanying drawings.

DETAILED DESCRIPTION OF THE EMBODIMENTS

Figure 1:
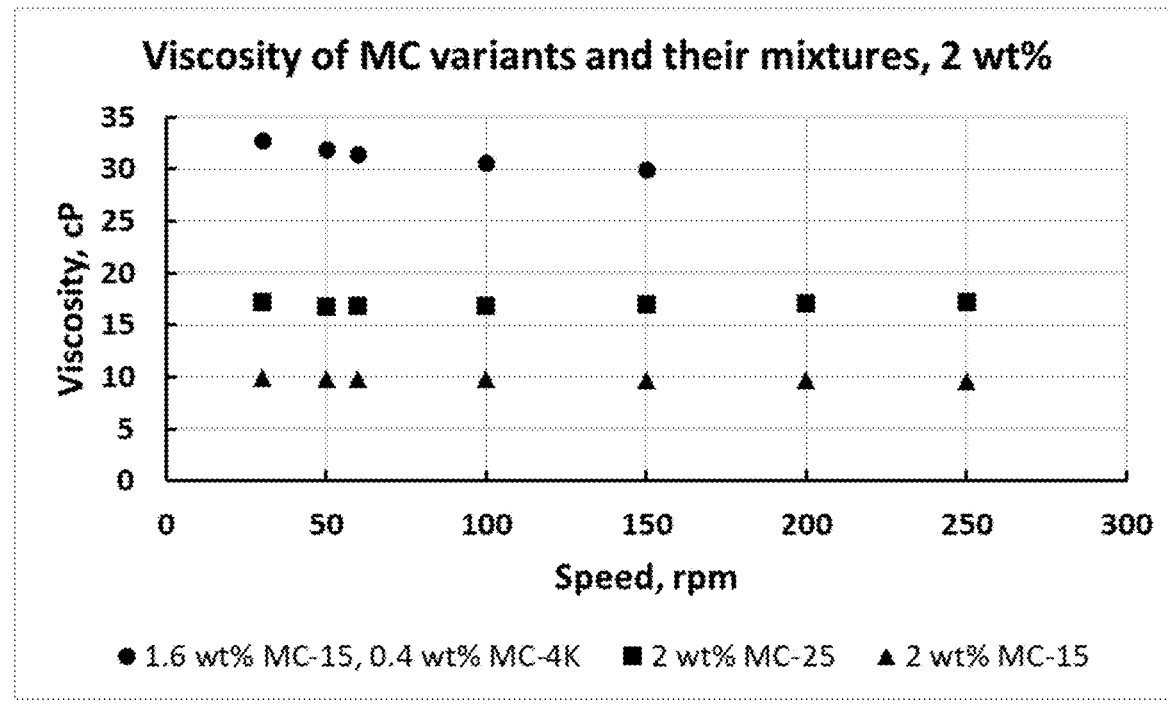
FIG. 1 shows the viscosities of 2 wt. % methyl cellulose solutions and their mixtures.

It will be understood that the disclosure described and defined in this specification extends to all alternative combinations of two or more of the individual features mentioned or evident from the text or drawings. All of these different combinations constitute various alternative aspects of the disclosure.

Definitions

For purposes of interpreting this specification, terms used in the singular will also include the plural and vice versa.

As used herein, except where the context requires otherwise, the term "comprise" and variations of the term, such as "comprising", "comprises" and "comprised", are not intended to exclude further additives, components, integers or steps.

"About" as used herein when referring to a measurable value such as an amount, a temporal duration, and the like, is meant to encompass variations of ±20% or ±10%, in some instances ±5%, in some instances ±1%, and in some instances ±0.1% from the specified value, as such variations are appropriate to perform the disclosed methods.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

As used herein, the term "alkylated cellulose" refers to a cellulose derivative in which one or more of the —OH groups in cellulose are replaced by —OR groups, wherein R is a linear or branched alkyl group, such as, for example, methyl, ethyl, n-propyl, iso-propyl, and n-butyl. Alkylated cellulose, may, in addition to having —OR groups, have one or more of the —OH groups functionalised by other groups, such as hydroxyalkyl or carboxyalkyl.

In considering the problem of protecting structural gaps from burning ember ingress the present inventors considered that a stable foam may provide the necessary protective properties. However, there are challenges in providing suitable aqueous based foams as they are generally thermodynamically unstable. Foam structure can quickly deteriorate, particularly when subjected to high environmental temperatures, for example temperatures up to and even in excess of 40° C.

The present disclosure relates to foamable liquid compositions which, when foamed, provide protection against the spread of fire from burning embers. The foamable liquid compositions comprise three main components which operate to provide strength and longevity to formed foams.

The foams find use in protecting structures from the spread of fire. Particularly, the foams are designed to eliminate or reduce the likelihood that burning embers can spread fire.

Foamable Liquid Compositions

The present disclosure provides a foamable liquid composition comprising:
a) 0.5 to about 4 wt. % of one or both of cellulose nanocrystals and cellulose nanofibrils;
b) about 0.1 to about 5 wt. % of one or more nanoclays;
c) about 0.1 to about 3 wt. % of one or more surfactants; and
d) up to about 98 wt. % water;
based on the total weight of the foamable liquid composition;
wherein the one or more surfactants comprise at least one alkylated cellulose.

In embodiments the foamable liquid composition comprises:
a) 0.5 to about 4 wt. % of cellulose nanocrystals;
b) about 0.1 to about 5 wt. % of one or more nanoclays;
c) about 0.1 to about 3 wt. % of one or more surfactants; and
d) up to about 98 wt. % water;
based on the total weight of the foamable liquid composition;
wherein the one or more surfactants comprise at least one alkylated cellulose.

In embodiments the foamable liquid composition comprises:
a) 0.5 wt. % to about 2 wt. % of one or both of cellulose nanocrystals and cellulose nanofibrils;
b) about 0.1 wt. % to about 2 wt. % of one or more nanoclays;
c) about 0.1 wt. % to about 2 wt. % of one or more surfactants; and
d) up to about 98 wt. % water;
based on the total weight of the foamable liquid composition;
wherein the one or more surfactants comprise at least one alkylated cellulose.

In embodiments the foamable liquid composition comprises:
a) 0.5 wt. % to about 2 wt. % of cellulose nanocrystals;
b) about 0.1 wt. % to about 2 wt. % of one or more nanoclays;
c) about 0.1 wt. % to about 2 wt. % of one or more surfactants; and
d) up to about 98 wt. % water;
based on the total weight of the foamable liquid composition;
wherein the one or more surfactants comprise at least one alkylated cellulose.

In embodiments, the foamable liquid composition comprises:
a) 0.5 wt. % to about 2 wt. % of one or both of cellulose nanocrystals and cellulose nanofibrils;
b) about 0.1 wt. % to about 1 wt. % of one or more nanoclays;
c) about 0.2 wt. % to about 1 wt. % of one or more surfactants; and
d) up to about 98 wt. % water;
based on the total weight of the foamable liquid composition;
wherein the one or more surfactants comprise at least one alkylated cellulose.

In embodiments, the foamable liquid composition comprises:
a) 0.5 wt. % to about 2 wt. % of cellulose nanocrystals;
b) about 0.1 wt. % to about 1 wt. % of one or more nanoclays;
c) about 0.2 wt. % to about 1 wt. % of one or more surfactants; and
d) up to about 98 wt. % water;
based on the total weight of the foamable liquid composition;
wherein the one or more surfactants comprise at least one alkylated cellulose.

The foamable liquid compositions of the present disclosure typically comprise dispersions of one or both cellulose nanocrystals and cellulose nanofibrils, and nanoclays in an aqueous solution of one or more surfactants. The compositions are typically stable dispersions such that the dispersed components do not settle to any appreciable extent over time. This is advantageous as it eliminates or reduces the need for components to be mixed on site, thus reducing equipment requirements and operator involvement. The foamable liquid composition may be stored and transported to a particular location and used as is. This is important when a rapid response to an approaching fire front may be required.

Another advantageous of the foamable liquid compositions is that they may contain environmentally benign components. This may be particularly important when large amounts of the compositions may be deployed.

The foamable liquid compositions, advantageously, have a viscosity that facilitates transfer by, for example, pressure transfer. In embodiments, the foamable liquid composition has a viscosity of about 10 to about 2000 mPa·s, or from about 10 to about 1000 mPa·s, measured at 20° C.

The thixotropic nature of the foamable liquid compositions advantageously achieve improved colloidal stability by having a higher viscosity at the rest state. Settling of suspended solids, such as nanoclay particles, can be prevented or reduced, so to give consistent performance.

Cellulose Nanocrystals or Nanofibrils

Cellulose nanocrystals are nanomaterials derived from the abundant natural polymer, cellulose. Cellulose nanocrystals obtained from naturally occurring cellulose fibers are biodegradable and renewable and are therefore sustainable and environmentally friendly materials. Cellulose is a tough and water-insoluble polymer.

Naturally occurring bulk cellulose consists of highly ordered, crystalline regions along with some disordered (amorphous) regions in varying proportions, depending on its source. It is known that when cellulose is subjected to a combination of mechanical, chemical, and enzyme treatments, highly crystalline regions of cellulose microfibrils can be extracted, resulting in the formation of cellulose nanocrystals (CNCs). CNCs are stiff rod-like particles consisting of cellulose chain segments in a nearly perfect crystalline structure. These nanocrystals may also be referred to as whiskers, nanoparticles, or microcrystallites. The cellulose nanocrystals may be needle shaped with a length less than about 500 nm and a diameter less than about 20 nm.

In some embodiments, the cellulose nanocrystals have a surface area of greater than about 300 $m^2/g$.

The amount of cellulose nanocrystals and/or cellulose nanofibrils in the foamable liquid compositions may be 0.5 wt. % to about 4 wt. %, or 0.5 wt. % to about 3.5 wt. %, or 0.5 wt. % to about 3 wt. %, or 0.5 wt. % to about 2.5 wt. %, or 0.5 wt. % to about 2 wt. %, or 0.5 wt. % to about 1.5 wt. %.

Without wishing to be bound by theory it is proposed that the cellulose nanocrystals or nanofibrils work cooperatively with the surfactant, such as methyl cellulose, present in the foamable liquid composition. When foamed with air, the air bubbles are stabilised by the cellulose nanocrystals or nanofibrils populating at the air-water interface.

Nanoclay

Nanoclays are nanoparticles containing layered mineral silicates. The nanoclay may comprise, for example, one or more of montmorillonite, bentonite, kaolinite, hectorite, and halloysite.

In some embodiments the nanoclay comprises bentonite.

In embodiments, the nanoclay has an average particle size (d50) from about 5 micron to about 100 micron as measured, for example, by laser diffraction.

In embodiments, the nanoclay has an average particle size (d50) of less than about 75 micron.

The amount of nanoclay in the foamable liquid compositions may be about 0.1 wt. % to about 5 wt. %, or about 0.1 wt. % to about 4.5 wt. %, or about 0.1 wt. % to about 4 wt. %, or about 0.1 wt. % to about 3.5 wt. %, or about 0.1 wt. % to about 3 wt. %, or about 0.1 wt. % to about 2.5 wt. %, or about 0.1 wt. % to about 2 wt. %, or about 0.1 wt. % to about 1.5 wt. %, or about 0.1 wt. % to about 1 wt. %, or about 0.1 wt. % to about 0.5 wt. %.

Without wishing to be bound by theory it is proposed that the nanoclay promotes char formation in the foamed compositions and retains the structure of dried foam upon thermal degradation by heat, such as when exposed to flame. It is also envisaged that the nanoclay may also act as Pickering agent, to further control (reduce) foam bubble size, and stabilise the bubbles by reinforcing the air-water interface.

Surfactant

In embodiments, the one or more surfactants comprise one or more alkylated cellulose derivatives. The one or more alkylated cellulose derivatives may comprise one or more of alkyl cellulose, hydroxyalkyl alkyl cellulose, and carboxyalkyl alkyl cellulose. Suitable alkylated cellulose include, for example, methyl cellulose, ethyl cellulose, methylethyl cellulose, hydroxylpropyl methyl cellulose, hydroxyethyl methyl cellulose and carboxymethyl methyl cellulose.

The amount of surfactant in the foamable liquid compositions may be about 0.2 wt. % to about 3 wt. %, or about 0.2 wt. % to about 2.5 wt. %, or about 0.2 wt. % to about 2 wt. %, or about 0.2 wt. % to about 1.5 wt. %, or about 0.2 wt. % to about 1 wt. %, or about 0.2 wt. % to about 0.5 wt. %.

In embodiments, a 2 wt. % aqueous solution of the one or more alkylated cellulose derivatives has a viscosity of about 10 to about 4000 mPa·s measured at 20° C.

Auxiliaries

A number of auxiliary components may be present in the foamable liquid compositions, including but not limited to, flame retardants, char promoting agents, preservatives, biocides, foam boosters, anti-corrosion agents, viscosity adjusting agents, or any mixture of these components.

Methods of Preparing Foamable Liquid Compositions

The foamable liquid compositions of the present disclosure are suitably prepared by combining one or both cellulose nanocrystals and cellulose nanofibrils, one or more nanoclays, one or more surfactants, and water.

In embodiments, the one or both cellulose nanocrystals and cellulose nanofibrils, and the one or more nanoclays are separately dispersed in water before combining, followed by addition of the one or more surfactants.

On preparation, the foamable liquid compositions may contain a large amount of water, up to 98% by weight or more. They may contain a dispersion of one or both cellulose nanocrystals and cellulose nanofibrils and one or more nanoclays in water.

Foam Compositions

A feature of the foamable liquid compositions of the present disclosure is their ability to form stable foams having significant longevity. This is desirable in applications where these features are important. Additionally, the foams possess heat resistant properties such that stability and longevity are minimally impacted by thermal exposure.

In embodiments, the foams of the present disclosure may retain a high proportion of water when exposed to environmental conditions for extended periods of time. The foams may lose less than 70%, or less than 60%, or less than 50% by weight of water content through evaporation after 48 hours when exposed to a temperature of 40° C.

The ability of the foams to retain water for significant time periods is highly advantageous as the water may serve as an extinguishing agent when a burning ember is lodged in the foam.

In embodiments, the foams of the present disclosure may have a high foam expansion ratio, that is, the ratio of the volume of foam to the volume of foamable liquid composition. Foam expansion ratios may be greater than 2, or greater than 3, or greater than 4.

In embodiments, the foams of the present disclosure possess high stability over time.

In embodiments, subsequent to foam creation, the foam volume decreases by less than 25%, when stored for 7 days at 20° C., or less than 20%, or less than 15%, or less than 10%, or less than 5%.

In embodiments, subsequent to foam creation, the amount of water lost from the foam through drainage is less than 25% by weight of the total water in the initially formed foam, when the foam is stored for 7 days at 20° C., or less than 20% by weight, or less than 15% by weight, or less than 10% by weight, or less than 5% by weight.

In embodiments, the foams of the present disclosure may resist collapse or deterioration when contacted by a burning ember.

In embodiments, the foams of the present disclosure remain substantially structurally intact when exposed to flame.

In embodiments, the foams of the present disclosure lose less than 90% of their mass after exposure to flame.

A characteristic of the presently disclosed foams is their ability to form a char when exposed to flame. While exposure to flame results in foam mass loss, the components of the foam work cooperatively to retain the structural integrity of the foam. The is highly advantageous as, even after flame exposure, the remaining foam structure is sufficient to resist burning ember ingress, thus protecting underlying structures from burning ember penetration.

Method of Preparing Foams

The foams may be prepared by entraining gas into the foamable liquid compositions. The gas is typically air, although other gases may be utilised. The foams may be suitably prepared by entraining compressed air into the foamable liquid compositions, for example through use of foam gun. Other foam preparation methods are contemplated, for example high-speed agitation.

Viscosity measurements were performed with an ATAGO VISCO™-895 viscometer over a range of speed from 30 to 250 rpm (if applicable). Spindle UL and A2 were used with the respective settings to obtain viscosity at the best suitable measurement range.

Samples were initially prepared at 2 wt. % in water (the concentration used by the supplier to classify methyl cellulose by viscosity) to validate the viscosity differences between different methyl cellulose variants, and study the effect of MC-4K (a higher viscosity methyl cellulose) on viscosity when used in combination with MC-15 (a lower viscosity methyl cellulose). Table 1 collects the results of this study and FIG. 1 shows plots of the results. Viscosities are in mPa·s (cP).

TABLE 1

| Sample | Speed, rpm | | | | | | |
|---|---|---|---|---|---|---|---|
| | 30 | 50 | 60 | 100 | 150 | 200 | 250 |
| | Viscosity (mPa · s) | | | | | | |
| 1.6 wt. % MC-15, 0.4 wt. % MC-4K | 32.79 | 31.83 | 31.47 | 30.63 | 29.93 | N/A | N/A |
| 2 wt. % MC-15 | 9.96 | 9.82 | 9.85 | 9.78 | 9.73 | 9.69 | 9.63 |
| 2 wt. % MC-25 | 17.21 | 16.81 | 16.9 | 16.93 | 17 | 17.14 | 17.24 |
| 2 wt. % MC-4K | N/A | 2257 | 2163.3 | 1902.5 | 1674.9 | 1519.6 | 1403.9 |

Method of Preventing the Spread of Fire

The present disclosure provides a method for the prevention of the spread of fire through applying the foam according to the present disclosure to an area requiring such protection.

One embodiment of the method is the application of the foams of the present disclosure to gaps in structures which may be vulnerable to burning ember ingress. During a wild fire burning embers can be carried by the wind to locations well beyond the fire front. This can lead to rapid spread of the fire. If burning embers become lodged in gaps in structures, for example in gutters and the like, and these gaps contain potentially combustible materials, such as leaves, then fire may ensue. Application of the foam of the present disclosure to such gaps can afford protection against ember ingress and thus the spread of fire.

EXAMPLES

Materials

Cellulose nanocrystals (CNC) were CelluForce NNC® and were obtained from CelluForce Inc., Canada. Nanoclay was Cloisite Na+ (d50<25 micron) or 116 (d50<15 micron) and were obtained from BYK. Bentonite having a d50 of 45 micron was obtained from The Source Bulk Foods, Australia. Methylcellulose (of various viscosities, MC) was obtained from Shin-Etsu Chemical Co., Ltd. Hydroxyethyl cellulose (HEC) and Polysorbate 20 were obtained from New Directions, Australia. Hydroxypropylmethyl cellulose (HPMC) was obtained from Sigma Aldrich and sodium carboxy methyl cellulose (SCMC) from Melbourne Food Depot, Australia.

Example 1: Viscosity of Methyl Cellulose

An initial study was conducted to obtain the viscosity profiles of methyl cellulose variants. The variants studied were MC-15, MC-25 and MC-4K, which have, respectively, viscosities of about 15 mPa·s, 25 mPa·s and 4000 mPa·s of a 2 wt. % solution in water at 20° C., according to manufacturer supplied datasheets.

The viscosity profile of MC-4K is not present in FIG. 1 since it is out-of-range. The results indicated that the combination of MC-15 and MC-4K rendered a substantial increase in viscosity relative to MC-15 alone.

Figure 2:
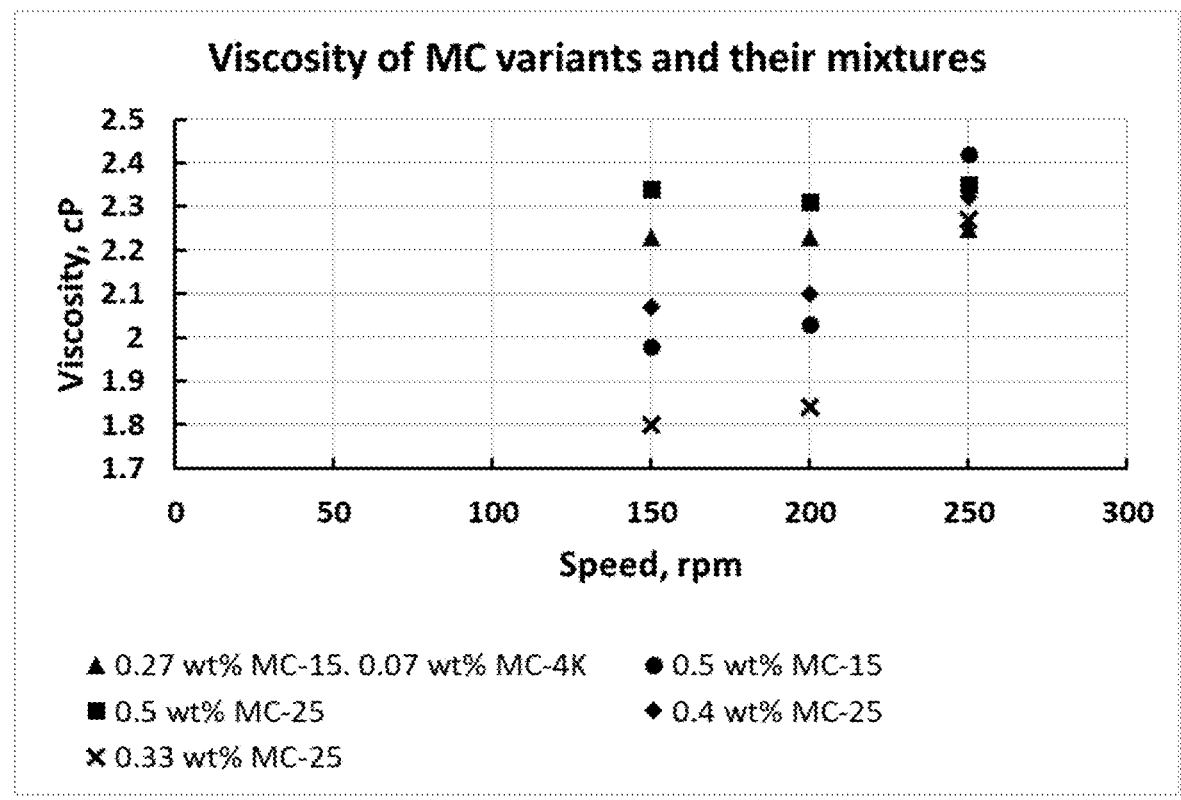
FIG. 2 shows the viscosities of methyl cellulose variants and their mixtures

Samples of methyl cellulose or their mixtures were then prepared in water at lower concentrations and the viscosity results are collected in Table 2 and shown in FIG. 2. Viscosities are in mPa·s (cP).

TABLE 2

| Sample | Speed, rpm | | |
|---|---|---|---|
| | 150 | 200 | 250 |
| | Viscosity (mPa · s) | | |
| 0.27 wt. % MC-15, 0.07 wt. % MC-4K | 2.23 | 2.23 | 2.25 |
| 0.5 wt. % MC-15 | 1.98 | 2.03 | 2.42 |
| 0.5 wt. % MC-25 | 2.34 | 2.31 | 2.35 |
| 0.4 wt. % MC-25 | 2.07 | 2.1 | 2.32 |
| 0.33 wt. % MC-25 | 1.8 | 1.84 | 2.27 |

The viscosity of the samples could not be measured at speed below 150 rpm due to the detection limit of the viscometer. The results indicated that the rheological behaviour of the MC-15/MC-4K mixture could be matched by 0.5 wt. % MC-25. The use of a single methyl cellulose in a formulation has the advantage of simplifying the process of sourcing material and manufacturing, although mixtures of methyl cellulose could also be utilised.

Example 2: Preparation of Foamable Liquid Compositions

Several foamable liquid compositions were prepared by mixing cellulose nanocrystals, one or more surfactants (methyl cellulose variants), and, optionally, nanoclay (Na+ or 116) and small amounts of auxiliaries, in water.

The wt. % of each component is shown in Table 3, with the balance to 100 wt. % being water.

TABLE 3

| Formula | Ingredients, wt. % | | | | | |
|---|---|---|---|---|---|---|
| | CNC | Nanoclay | MC-15 | MC-25 | MC-4K | Auxiliaries |
| T1-T2 | 1.0-2.0 | 0.0 | 0.1-0.5 | 0.0 | 0.0 | 0.0 |
| T3-T5 | 1.0-2.0 | 0.5-1.0 | 0.1-0.5 | 0.0 | 0.0 | 0.0 |
| T6-T11 | 1.0-2.0 | 0.5-1.0 | 0.1-0.5 | 0.0 | 0.0-0.5 | 0.0-2.0 |
| T12-T16 | 0.5-2.0 | 0.5-1.0 | 0.0-2.0 | 0.0-2.0 | 0.5-2.0 | 0.0 |
| T17-T19 | 0.5-2.0 | 0.1-0.5 | 0.5-2.0 | 0.5-2.0 | 0.0 | 0.1-0.5 |
| T20-T26 | 0.5-2.0 | 0.5-1.0 | 0.2-1.0 | 0.2-1.0 | 0.05-1.5 | 0.0 |
| T26.1-T26.3 | 1.0-2.0 | 0.3-0.5 | 0.0-0.5 | 0.0-0.5 | 0.0 | 0.0 |

Example 3: Foam Preparation 10 ml of foamable liquid composition was added to a 50-mL centrifuge tube (with additional graduated marks at 0.2, 0.5, 1, 2, 3, 4 mL). The composition was aerated using a milk frothing wand and a vortex agitator was used to distribute the mixture thoroughly during the aeration process. The foam formed in 2-3 min, indicated by a consistent fine lather and no further expansion in volume. Total foam volume, weight and drainage were recorded immediately after the foam had formed. All samples were stored at ambient temperature (around 21° C.) during the study. Humidity level was not monitored.

The viscosities of the formulations and the expansion ratios of the foams formed from the formulations are collected in Table 4.

TABLE 4

| Formula | †Viscosity @ 30 rpm, mPa · s | †Viscosity @ 250 rpm, mPa · s | *Expansion ratio |
|---|---|---|---|
| T2 | 123.1 (5) | 59.89 (6) | 3.5 (good, 4) |
| T3 | 852.5 (8) | 107.7 (8) | 2.6 (fair, 7) |
| T5 (Cloisite-Na+) | 368.9 (6) | 58.72 (5) | 2.6 (fair, 7) |
| T5 (Cloisite-116) | 422.1 (7) | 63.04 (7) | 2.8 (fair, 6) |
| T26 (Cloisite-Na+) | 53.26 (3) | 16.20 (4) | 3.1 (good, 5) |
| T26 (Cloisite-116) | 84.13 (4) | 14.22 (2) | 4.0 (excellent, 1) |
| T26.2 | 41.50 (2) | 14.46 (3) | 3.9 (excellent, 2) |
| T26.3 | 30.86 (1) | 12.98 (1) | 3.8 (excellent, 3) |

†Number in brackets is the ranking of viscosity from the lowest to the highest.
*Number in brackets is the ranking of expansion ratio from the highest to the lowest.

Figure 3:
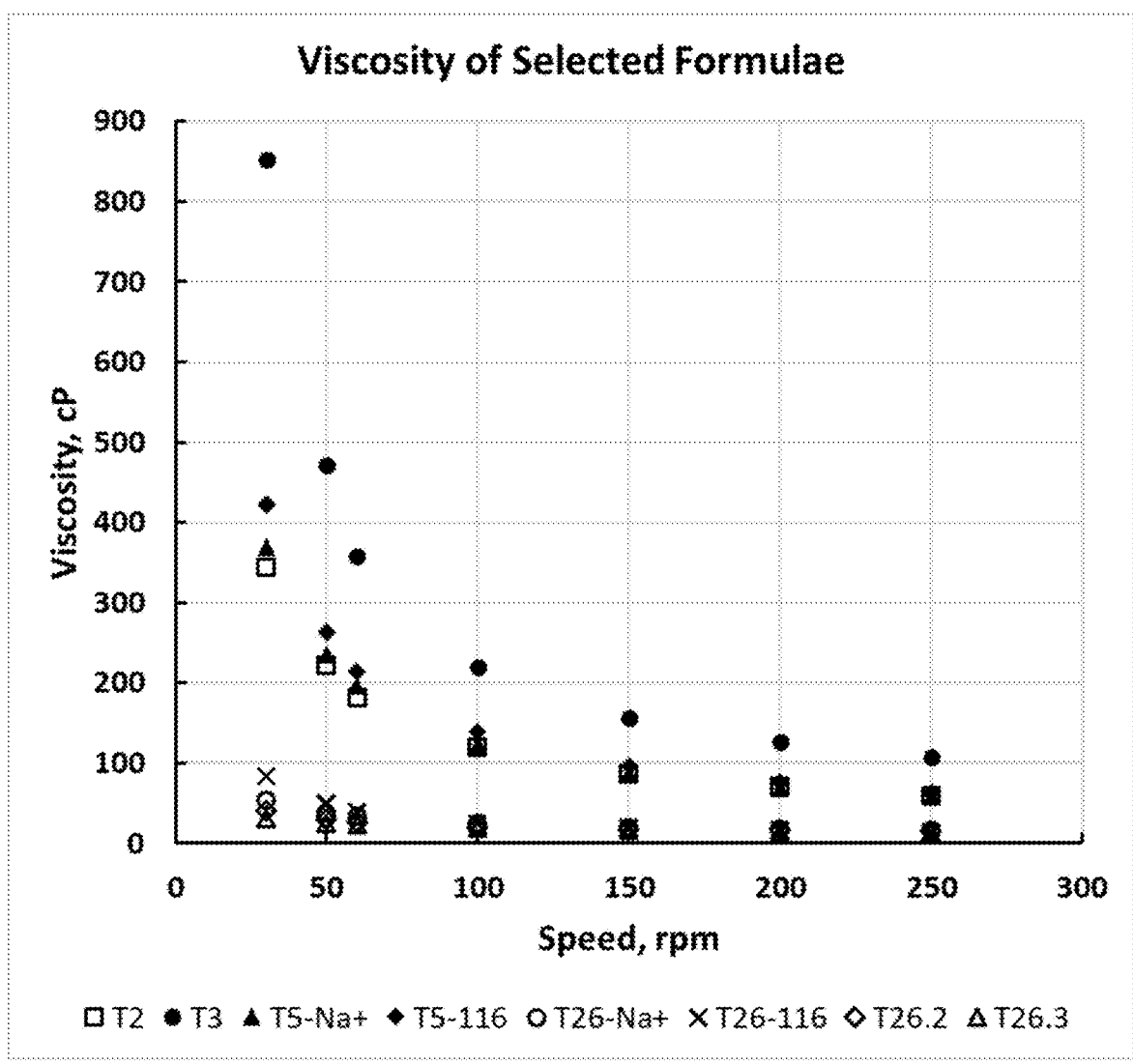
FIG. 3 shows the viscosity profiles of foamable liquid compositions according to embodiments of the present disclosure.

There was no direct correlation between the viscosity (at both low and high shear rates) and the foam expansion ratio of compositions according to the rankings in Table 4. The use of nanoclay had a stronger influence on foam volume. For example, T2 and T3 were equivalent except that T3 contained Cloisite-Na+, which significantly restricted its foam expansion. Furthermore, compositions prepared with Cloisite-116 expanded to a greater extent compared to those prepared with Cloisite-Na+ despite the higher viscosity of the foamable liquid composition. Viscosity measurements and the viscosity profiles of the selected formulations are collected in Table 5 and illustrated in FIG. 3, respectively.

TABLE 5

| Formula | Speed, rpm | | | | | | |
|---|---|---|---|---|---|---|---|
| | 30 | 50 | 60 | 100 | 150 | 200 | 250 |
| | Viscosity (mPa · s) | | | | | | |
| T2 | 343.5 | 221.5 | 181.3 | 119.5 | 87.42 | 70.40 | 59.89 |
| T3 | 852.5 | 471.1 | 358.2 | 219.4 | 156.5 | 127.1 | 107.7 |
| T5 (Cloisite-Na+) | 368.9 | 235.8 | 196.3 | 123.5 | 87.04 | 69.27 | 58.72 |
| T5 (Cloisite-116) | 422.1 | 262.4 | 214.0 | 139.3 | 96.93 | 75.94 | 63.04 |
| T26 (Cloisite-Na+) | 53.26 | 37.72 | 33.53 | 24.78 | 20.04 | 17.73 | 16.20 |
| T26 (Cloisite-116) | 84.13 | 49.07 | 39.84 | 25.19 | 18.94 | 16.06 | 14.22 |
| T26.2 | 41.50 | 30.69 | 27.05 | 21.40 | 17.86 | 15.80 | 14.46 |
| T26.3 | 30.86 | 24.83 | 23.07 | 18.69 | 15.78 | 14.12 | 12.98 |

Example 4: Influence of Components on Foam Stability

A stability study over a 1 hour period was performed to determine the influence of each component and their combinations on foam formation. The formulations were all based on formulation T26.3. Formulation T5 was also compared. Details of the formulations, initial and final foam volumes and water drainage are show in Table 6.

TABLE 6

| †Ingredients/ combination | Reference formula | Initial vol., mL | Final vol., mL | Drainage, mL |
|---|---|---|---|---|
| MC15 | T26.3 | 31 | 11 | 9.5 |
| CNC | T26.3 | *10 | *10 | N/A |
| Cloisite-116 | T26.3 | *10 | *10 | N/A |
| CNC + Cloisite-116 | T26.3 | *10 | *10 | N/A |
| MC15 + CNC | T26.3 | 31 | 30 | 6.0 |
| MC15 + Cloisite-116 | T26.3 | 30 | 10 | 9.5 |
| MC15 + Cloisite-Na+ | T5 (Cloisite-Na+) | 30 | 12 | 10 |

†Concentration of the ingredients used was the same as that used in the reference formula and balanced with water.
*No foam formed.

Due to the short-term stability of some of the samples, the duration of the study was only 1 hour.

As shown in Table 6, a surfactant must be present to promote foam formation. Neither CNC nor nanoclay (nor their combination) could generate foam at all. Combinations of methyl cellulose and nanoclay generated foam that lacked stability, as did methyl cellulose alone. The results clearly indicated that nanoclay alone is not sufficient to stabilise the foam. Foam stability was substantially improved for the combination of methyl cellulose and CNC, demonstrating that CNC played a crucial role in stabilising the air-water interface.

Example 5: Long Term Foam Stability Study

Several foams were prepared for a 7-day stability study. The study was conducted in an enclosed scenario for all samples (i.e., capped), eliminating the influence of evaporative loss of water on foam volume. The enclosed scenario also illustrated the influence of accumulated water content on drainage rate and bubble coalescence. Final volume and weight were recorded at the end of the study. Drainage was monitored during the study and the final quantity was recorded at the end. The results are collected in Table 7.

TABLE 7

| Formula | Initial vol., mL | Final vol., mL | Drainage, mL |
|---|---|---|---|
| T2 | 35.0 | 34.0 | <0.2 |
| T3 | 26.0 | 25.5 | 0.0 |
| T5 (Cloisite-Na+) | 26.0 | 25.5 | 0.0 |
| T5 (Cloisite-116) | 28.5 | 28.0 | 0.0 |
| T26 (Cloisite-Na+) | 31.0 | 30.5 | 1.0 |
| T26 (Cloisite-116) | 40.0 | 39.5 | 0.0 |
| T26.2 | 39.0 | 38.5 | <0.2 |
| T26.3 | 38.0 | 37.5 | 5.0 |

All formulations indicated good foam stability over the 7 day period through comparison of initial and final volumes of the foam. Water drainage was also minimal for most of the foams with some foams having zero water drainage over the study period.

Drainage could be affected by several factors, such as use of nanoclay and the type of methyl cellulose used. The use of nanoclay could help improve the stability of the foam (compare T2 and T3). MC-25 could also provide higher stability than MC-15 (compare T26.2 and T26.3). The overall stability effect was believed to be due to an increased viscosity, especially at the rest state. As shown in Table 7, formulae with lower viscosity appeared more susceptible to drainage.

Some compositions were selected to be studied in an open scenario (i.e., uncapped) to understand the influence of evaporative loss on foam volume, drainage rate, and bubble coalescence. Total volume, drainage, and weight of samples were monitored and recorded daily during the study. T5 (Cloisite-116), T26.2 and T26.3 were selected to be studied in the open scenario and the results are shown in Table 8.

TABLE 8

| Formula | Initial vol., mL | †Final vol., mL | Drainage, mL | Change in vol., mL | Evaporative loss, g |
|---|---|---|---|---|---|
| T5 (Cloisite-116) | 32.0 | 31.0 | 0.0 | 1.0 | 1.4 (6.8%) |
| T26.2 | 37.0 | 36.0 | 0.2 | 1.0 | 1.6 (8.2%) |
| T26.3 | 38.0 | 25.0 | 5.0 | *13 | 1.4 (7.3%) |

†Including section of dry foam at the top.
*No intact dry foam at the top as bubbles coalesced/collapsed.

The difference in volume of drainage between capped and uncapped samples was negligible. The results indicated that drainage rate could be dictated by the intrinsic stability of the formula rather than by environmental factors.

It was expected that uncapped samples would have the foam collapsing to a higher extent compared to capped samples due to evaporative loss of water. The loss water triggered the receding of the wet section of the foam and hence lowered the volume gradually. For relatively stable formulae (i.e., T5 and T26.2), the loss of water had little influence on the rate of coalescence of the bubbles. The influence became more significant for formulae (i.e., T26.3) that were inherently unstable. It should be noted that no evaporative loss was observed from the enclosed samples (data not shown).

Regarding bubble coalescence, there was little difference between capped and uncapped samples, even for the least stable T26.3. The overall rate of coalescence seemed to be independent of environmental factors.

Example 6: Evaporative Water Loss at Elevated Temperature

Foam samples (ca. 50 g) prepared with foamable liquid compositions T5 and T26, respectively, were stored in a dehydration device (Sunbeam Food Lab™ Electronic Dehydrator) and subjected to elevated temperature (40° C.) for 48 h under constant low air flow to quantify the loss of water content. The purpose of the study was to understand the effect of temperature on the foam during a hot summer under accelerated drying conditions. The evaporative water loss from the foams was compared with that of water under the same conditions.

Figure 4:
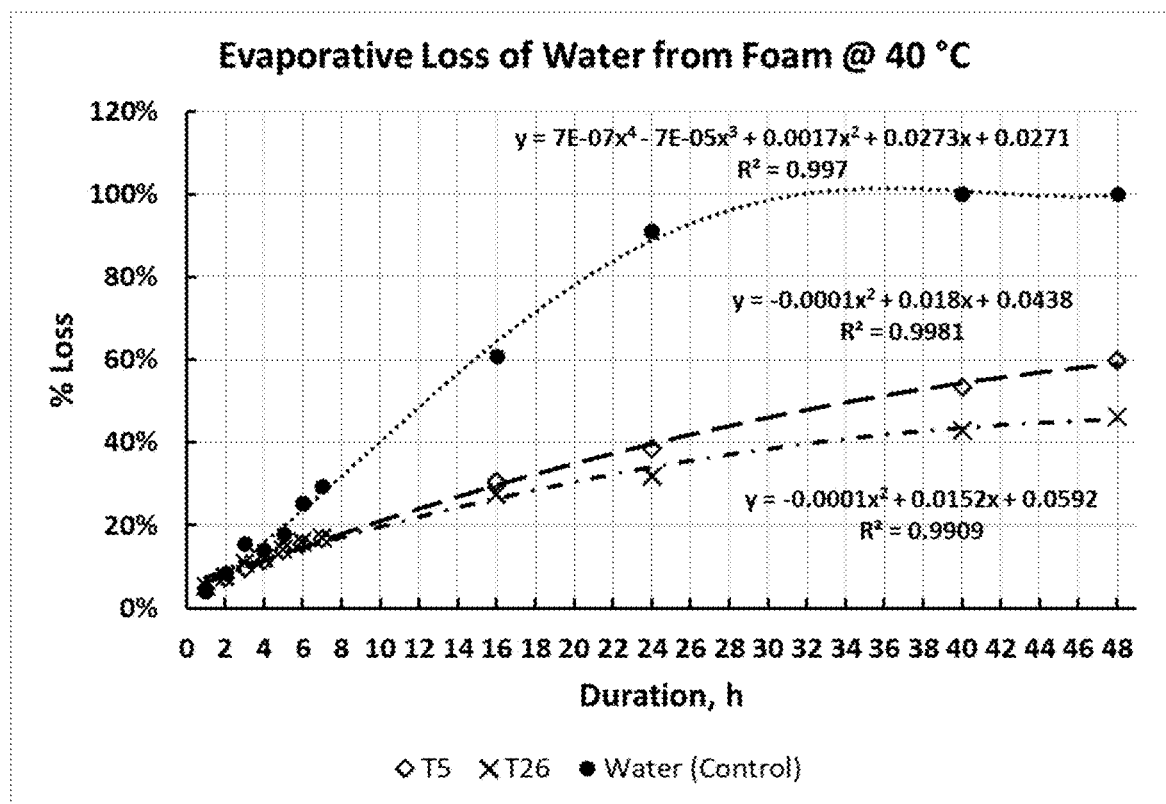
FIG. 4 shows the evaporative water loss over time from foams according to embodiments of the present disclosure compared to water alone.

The results are shown in FIG. 4. T26 demonstrated relatively lower evaporative loss compared to T5, however both compositions retained significant water content and it is notable that the rate of evaporative water loss decreased over time, suggesting significant water content would remain after longer high temperature exposure. Significantly, evaporative water loss from the foams was much less than that of water alone. After only 30 hours, 100% of the water control sample was lost to evaporation.

There was no major foam coalescence observed during the study. The volume of the foams increased slightly due to the heat. The top of the foams solidified and formed a tough layer, while the layer below was still moist. The tough layer is advantageous as (i) it acts as a physical barrier to counter the impact of a burning ember, and (ii) it forms a non-combustible char as a thermal barrier when the cellulose content is burnt off.

It is expected that elevated temperatures could be advantageous to foam stability since methyl cellulose has lower water solubility at higher temperatures and precipitation of methyl cellulose could assist in stabilising air bubbles.

Example 7: Char Formation of Foams

Approximately 20 g of foamable composition was aerated using a milk frothing wand. Aeration stopped when a homogeneous, thick lather had formed. The prepared foam was dried at 70° C. in a Sunbeam Food Lab™ Electronic Dehydrator until all water content had been removed (ca. 24 h). A section of the dried foam was cut out and burnt with a butane torch flame. The flame was removed when (i) charring stopped and (ii) the char no longer shrank. The results are collected in Table 9.

TABLE 9

| Formula | Initial weight, g | Final weight, g | Weight loss, % |
|---|---|---|---|
| T2 | 0.164 | 0.005 | 97.0% |
| T3 | 0.271 | 0.089 | 67.2% |
| T5 (Cloisite-Na+) | 0.101 | 0.014 | 86.1% |

TABLE 9-continued

| Formula | Initial weight, g | Final weight, g | Weight loss, % |
|---|---|---|---|
| T5 (Cloisite-116) | 0.400 | 0.069 | 82.8% |
| T26 (Cloisite-Na+) | 0.198 | 0.043 | 78.3% |
| T26 (Cloisite-116) | 0.217 | 0.028 | 87.1% |
| T26.2 | 0.299 | 0.041 | 86.3% |
| T26.3 | 0.233 | 0.033 | 85.8% |

Referring to the change in weight of the dried foam samples after burning the incorporation of nanoclay was critical to the formation and stability of char. When the dried foam was burnt, nanoclay present in the foam appeared to (i) promote char formation, and (ii) retain shape of the char. Formation of char provides a non-flammable physical barrier to prevent further ingress of ember.

Figure 5:
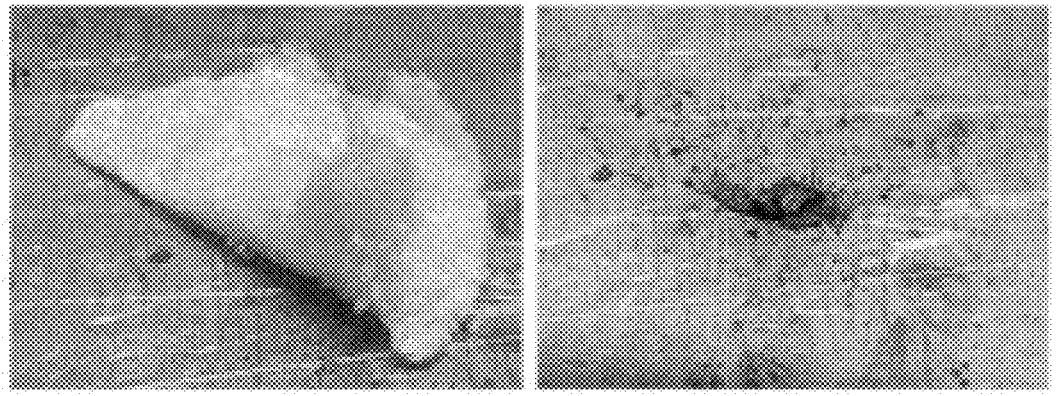
FIG. 5 shows photographs of foams after exposure to a flame: (a) shows the residue of a comparative foam, and, (b) the residue of a foam according to the present disclosure.
Figure 5:
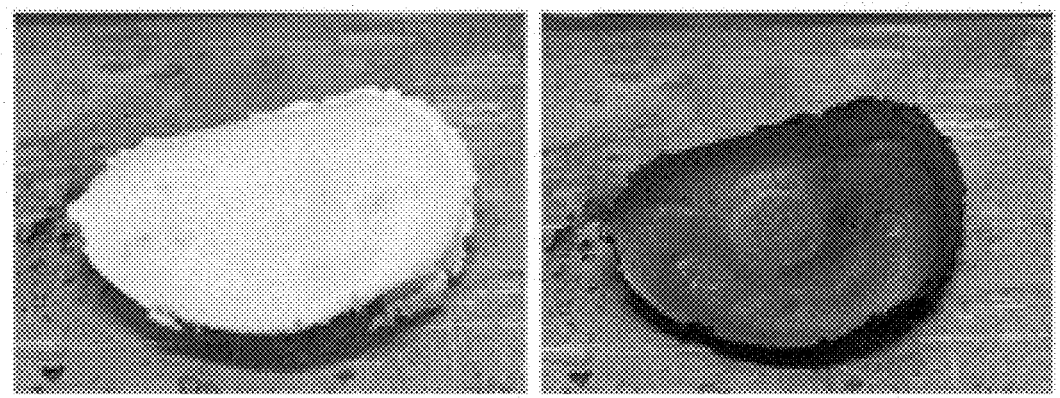

The formula without nanoclay, i.e., T2, experienced the highest weight loss after burning, and almost completely disappeared (see FIG. 5(a)). T3 had the highest nanoclay loading, which allowed it to retain a higher mass content and shape (see FIG. 5(b)). All other formulae show similar extent of weight loss, which could be attributed to the lower nanoclay content. Some shrinkage was observed from samples with lower nanoclay content, however there was a profound performance improvement compared to formulation T2, and all samples retained some degree of structural integrity.

Table 10 summarises various parameters.

TABLE 10

| Formula | Viscosity | Expansion | Drainage | Stability | Charring | †Practicality |
|---|---|---|---|---|---|---|
| T2 | Medium | Very good | Low | Good | Poor | Low |
| T3 | High | Good | None | Excellent | Excellent | Medium |
| T5 (Cloisite-Na+) | Medium | Good | None | Excellent | Good | Medium |
| T5 (Cloisite-116) | Medium | Good | None | Excellent | Good | Medium |
| T26 (Cloisite-Na+) | Low | Very good | Low | Good | Good | High |
| T26 (Cloisite-116) | Low | Excellent | Low | Excellent | Good | High |
| T26.2 | Low | Excellent | Low | Good | Good | High |
| T26.3 | Low | Excellent | Medium | Fair | Good | Medium |

†Considering viscosity, foam expansion ratio, drainage rate, foam stability, and charring ability Based on the results the formulae were ranked by their viscosity (ease of handling), foam expansion ratio, drainage rate, foam stability, and charring ability. All formulations according to the present disclosure gave an excellent balance of properties.

Example 8: Effect of Cellulose Nanocrystal Amount

A formulation similar to formulations T26.1-T26.3 as shown in Table 3 was prepared, but the amount of cellulose nanocrystal was only 0.4 wt. %. While the foam showed good expansion, rapid drainage occurred and the foam completely collapsed in 2 hours. Therefore, amounts of cellulose nanocrystals greater than 0.4 wt. % are necessary in order to obtain stable foams.

Example 9: Alternative Surfactant

A formulation similar to formulations T26.1-T26.3 as shown in Table 3 was prepared but the methyl cellulose surfactant was replaced by 0.4 wt. % Polysorbate 20 nonionic surfactant. While the foam showed reasonable expansion, the foam completely collapsed after a few hours. Therefore, without wishing to be bound by theory, it is envisaged that surfactants based on cellulose derivatives are advantageous to forming stable foams.

Example 10: Alternative Nanoclay

A formulation similar to formulations T26.1-T26.3 as shown in Table 3 was prepared, but the Cloisite nanoclay was replaced by bentonite of average particle size 45 micron. The resulting foam showed excellent expansion, low drainage, and good stability.

Example 11: Alternative Cellulose Based Surfactants

Formulations were prepared by replacing methyl cellulose surfactant with other cellulose derivatives and also using combinations of cellulose derivatives. The cellulose derivatives examined were hydroxyethyl cellulose (HEC) having a viscosity of 100-185 mPa·s at 0.5 wt. %, 21° C., hydroxypropyl methylcellulose (HPMC-40) having a viscosity of 40-60 mPa·s at 2 wt %, 20° C., and sodium carboxymethyl cellulose (SCMC) having a viscosity of 100-200 mPa·s at 0.5 wt %, 20° C.

Table 11 shows the wt. % of each component, with the balance to 100 wt. % being water.

TABLE 11

| Formula | CNC | Nanoclay | MC-15 | MC-25 | HEC | HPMC-40 | SCMC |
|---|---|---|---|---|---|---|---|
| | | | | wt. % | | | |
| T29 | 1.0-2.0 | 0.3-0.5 | 0.0 | 0.0 | 0.5 | 0.0 | 0.0 |
| T32 | 1.0-2.0 | 0.3-0.5 | 0.0 | 0.0 | 0.0 | 0.0 | 0.1-0.5 |
| T33 | 1.0-2.0 | 0.3-0.5 | 0.0 | 0.0 | 0.1 | 0.0 | 0.0 |
| T34 | 1.0-2.0 | 0.3-0.5 | 0.0-0.5 | 0.0-0.5 | 0.1-0.5 | 0.0 | 0.0 |
| T38 | 1.0-2.0 | 0.3-0.5 | 0.0 | 0.0 | 0.1-0.5 | 0.5 | 0.0 |
| T39 | 1.0-2.0 | 0.3-0.5 | 0.0-0.5 | 0.0-0.5 | 0.0 | 0.0 | 0.1-0.5 |
| T40 | 1.0-2.0 | 0.3-0.5 | 0.0 | 0.0 | 0.0 | 0.5 | 0.1-0.5 |

Table 12 shows the viscosity of the formulations of Table 11 and also the foam expansion ratios

TABLE 12

| Formula | †Viscosity @ 30 rpm, mPa · s | †Viscosity @ 250 rpm, mPa · s | Expansion ratio |
|---|---|---|---|
| T29 | 1553.6 | Out of range | No foam |
| T32 | 186.4 | 47.53 | No foam |
| T33 | 176.3 | 54.03 | No foam |
| T34 | 1454.4 | 137.4 | 2.5 |
| T38 | 614.6 | 124.3 | 2.7 |
| T39 | 446.2 | 83.14 | 3.5 |
| T40 | 319.1 | 76.68 | 3.5 |

The results show that formulations prepared with HEC as the only surfactant (T29 and T33) did not foam. The formulation prepared with SCMC as the only surfactant (T32) also did not foam. Both HEC and SCMC are non-alkylated cellulose derivatives.

Formulations prepared with a mixture of methyl cellulose and HEC (T34) or SCMC (T39) provided good and very good foam expansion respectively.

Formulations prepared with a mixture of HPCM-40 and HEC (T38) or HPCM-40 and SCMC (T40) provided good to very good foam expansion.

Table 13 collects foam stability and drainage results for the formulations of Table 12 that foamed.

TABLE 13

| Formula | Initial vol. mL | Final vol., mL | Drainage, mL |
|---|---|---|---|
| T34 | 25 | 25 | 0.0 |
| T38 | 24 | 24 | 1.0 |
| T39 | 34 | 34 | 0.1 |
| T40 | 35 | 35 | 0.0 |

The formulations showed excellent foam stability and very low drainage.

Table 14 provides an overall assessment of the performance of the formulations of Table 11.

TABLE 14

| Formula | Viscosity | Expansion | Drainage | Stability | †Practicality |
|---|---|---|---|---|---|
| T29 | Very high | N/A | N/A | N/A | N/A |
| T32 | Medium | N/A | N/A | N/A | N/A |
| T33 | Medium | N/A | N/A | N/A | N/A |
| T34 | Very high | Good | None | Excellent | Medium |
| T38 | High | Good | Low | Good | Medium |
| T39 | Medium | Very good | Low | Excellent | High |
| T40 | Medium | Very good | None | Excellent | High |

Considering practicality of the formulations in terms of viscosity, foam expansion, drainage, and stability, formulations absent an alkylated cellulose surfactant performed poorly and were unable to form foams. In contrast, formulations containing at least one alkylated cellulose surfactant performed well in terms of all tested parameters.

The invention claimed is:

1. A foamable liquid composition comprising:
    a) 0.5 wt. % to about 4 wt. % of one or both of cellulose nanocrystals and cellulose nanofibrils;
    b) about 0.1 wt. % to about 5 wt. % of one or more nanoclays;
    c) about 0.1 wt. % to about 3 wt. % of one or more surfactants; and
    d) up to about 98 wt. % water;
    based on the total weight of the foamable liquid composition; wherein the one or more surfactants comprise at least one alkylated cellulose, and wherein a 2 wt % aqueous solution of said at least one alkylated cellulose has a viscosity of about 10 to about 4000 mPa's measured at 20° C.

2. The foamable liquid composition according to claim 1 comprising:
    a) 0.5 wt. % to about 2 wt. % of one or both of cellulose nanocrystals and cellulose nanofibrils;
    b) about 0.1 wt. % to about 2 wt. % of one or more nanoclays;
    c) about 0.1 wt. % to about 2 wt. % of one or more surfactants; and
    d) up to about 98 wt. % water;
    based on the total weight of the foamable liquid composition;
    wherein the one or more surfactants comprise at least one alkylated cellulose.

3. The foamable liquid composition according to claim 1 comprising:
    a) 0.5 wt. % to about 1 wt. % of one or both of cellulose nanocrystals and cellulose nanofibrils;
    b) about 0.1 wt. % to about 1 wt. % of one or more nanoclays;
    c) about 0.2 wt. % to about 1 wt. % of one or more surfactants; and
    d) up to about 98 wt. % water;
    based on the total weight of the foamable liquid composition;
    wherein the one or more surfactants comprise at least one alkylated cellulose.

4. The foamable liquid composition according to claim 1, wherein the cellulose nanocrystals or nanofibrils are needle shaped with a length less than about 500 nm and a diameter less than about 20 nm.

5. The foamable liquid composition according to claim 1, wherein the cellulose nanocrystals or nanofibrils have a surface area of greater than about 300 m$^2$/g.

6. The foamable liquid composition according to claim 1, wherein the nanoclay comprises one or more of montmorillonite, bentonite, kaolinite, hectorite, and halloysite.

7. The foamable liquid composition according to claim 1, wherein the nanoclay comprises bentonite.

8. The foamable liquid composition according to claim 1, wherein the nanoclay has an average particle size (d50) of less than about 75 micron.

9. The foamable liquid composition according to claim 1, wherein the alkylated cellulose comprises one or more of alkyl cellulose, hydroxyalkyl alkyl cellulose, and carboxyalkyl alkyl cellulose.

10. The foamable liquid composition according to claim 9, wherein the alkylated cellulose comprises methyl cellulose, ethyl cellulose, methylethyl cellulose, hydroxylpropyl methyl cellulose, hydroxyethyl methyl cellulose and carboxymethyl methyl cellulose.

11. The foamable liquid composition according to claim 1, wherein the composition has a viscosity of about 10 to about 2000 mPa·s, or from about 10 to about 1000 mPa·s, measured at 20° C.

12. The foamable liquid composition according to claim 1, further comprising one or more auxiliaries.

13. The foamable liquid composition according to claim 1, wherein the foamable liquid composition comprises a stable dispersion of one or both cellulose nanocrystals and cellulose nanofibrils, and nanoclay.

14. A method of preparing a foamable liquid composition according to claim 1 comprising combining one or both cellulose nanocrystals and cellulose nanofibils, one or more nanoclays, one or more surfactants, and water.

15. The method according to claim 14, wherein the one or both cellulose nanocrystals and cellulose nanofibrils, and one or more nanoclays are separately dispersed in water before combining, followed by addition of the one or more surfactants.

16. A foam comprising the foamable liquid composition according to claim 1 and air.

17. The foam according to claim 16, wherein the foam has a volume expansion ratio of greater than 2, or greater than 3, or greater than 4.

18. The foam according to claim 16, wherein, subsequent to foam creation, the foam loses less than 70% by weight of water content through evaporation after 48 hours of exposure to a temperature of 40° C.

19. The foam according to claim 16, wherein, subsequent to foam creation, the foam loses less than 50% by weight of water content through evaporation after 48 hours of exposure to a temperature of 40° C.

20. The foam according to claim 16, wherein foam volume decreases by less than 25% after creation, when stored for 7 days at 20° C.

21. The foam according to claim 16, wherein the amount of water lost from the foam through drainage is less than 25% by weight when the foam is stored for 7 days at 20° C.

22. The foam according to claim 16, wherein the foam remains substantially structurally intact when exposed to flame.

23. The foam according to claim 16, wherein the foam loses less than 90% of its mass after exposure to flame.

24. A method of preparing a foam from the foamable liquid composition according to claim 1, comprising entraining air into the foamable liquid composition.

25. A method of protecting an area against the spread of fire, comprising covering at least part of the area with the foam according to claim 16.

26. The method according to claim 25, wherein the area is a structure, for example, a structure comprising one or more of wood, metal, concrete, and brick.

27. The method according to claim 25, wherein the area is a structural gap, and the structure comprises one or more of wood, metal, concrete, and brick.

28. The method according to claim 27, wherein the foam protects the structural gap from ember ingress into the structural gap.

* * * * *